US006582480B2

(12) United States Patent
Pasquier et al.

(10) Patent No.: US 6,582,480 B2
(45) Date of Patent: Jun. 24, 2003

(54) METHOD OF FABRICATING ELECTROCHEMICAL CELL

(75) Inventors: Eric Pasquier, Hickory, NC (US); Ib I. Olsen, Hickory, NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/122,332

(22) Filed: Apr. 16, 2002

(65) Prior Publication Data

US 2002/0108235 A1 Aug. 15, 2002

Related U.S. Application Data

(62) Division of application No. 09/468,352, filed on Dec. 21, 1999, now Pat. No. 6,426,163.

(51) Int. Cl.$^7$ .................................................. H01M 6/12
(52) U.S. Cl. ....................... 29/623.2; 29/623.1; 429/176
(58) Field of Search ............................. 29/623.2, 623.1; 429/176

(56) References Cited

U.S. PATENT DOCUMENTS

| 4,182,028 A | 1/1980 | Epstein et al. |
| 4,265,984 A | 5/1981 | Kaye |
| 4,855,196 A | 8/1989 | Eggers |
| 5,279,623 A | 1/1994 | Watanabe et al. |
| 5,302,110 A | 4/1994 | Desai et al. |
| 5,563,007 A | 10/1996 | Young et al. |
| 5,644,282 A | 7/1997 | Mehta et al. |
| 5,658,688 A | 8/1997 | Jolson |
| 5,688,293 A | 11/1997 | Oliver et al. |
| 5,868,790 A | 2/1999 | Vincent et al. |
| 6,004,693 A | 12/1999 | Fukuda et al. |
| 6,048,638 A | 4/2000 | Pendalwar |
| 6,048,639 A | 4/2000 | Sonozaki et al. |
| 6,218,041 B1 | 4/2001 | Barbier et al. |
| 6,242,130 B1 | 6/2001 | Noh et al. |

FOREIGN PATENT DOCUMENTS

| FR | 2 773 912 A1 | 7/1999 |
| GB | 2 020 888 A | 11/1979 |

OTHER PUBLICATIONS

Patent Abstracts of Japan vol. 009, No. 004 (E–288), Jan. 10, 1985 & JP 59 154747 A (Hitachi Maxell KK), Sep. 3, 1984 *abstract*.

Primary Examiner—John S. Maples
(74) Attorney, Agent, or Firm—Sughrue Mion, PLLC

(57) ABSTRACT

An electrochemical cell having a cell package made of a metallic material to allow the cell package to be sealed by welding, even when contaminated. The electrochemical cell further includes an electrode cell stack and a metallic cell package having a base portion and a lid portion which are welded to each other (peripheral seam) to define an enclosure. The cell package includes a first section for receiving the cell stack and a second section having an inlet port and a degassing port which communicate with the first section. The lid portion is welded to the base portion to form a weld seam located between the first and second sections to seal off the first section from the second section. The weld seam extends from the peripheral seam on a first side of the cell package to the peripheral seam on a second side of the cell package.

8 Claims, 5 Drawing Sheets

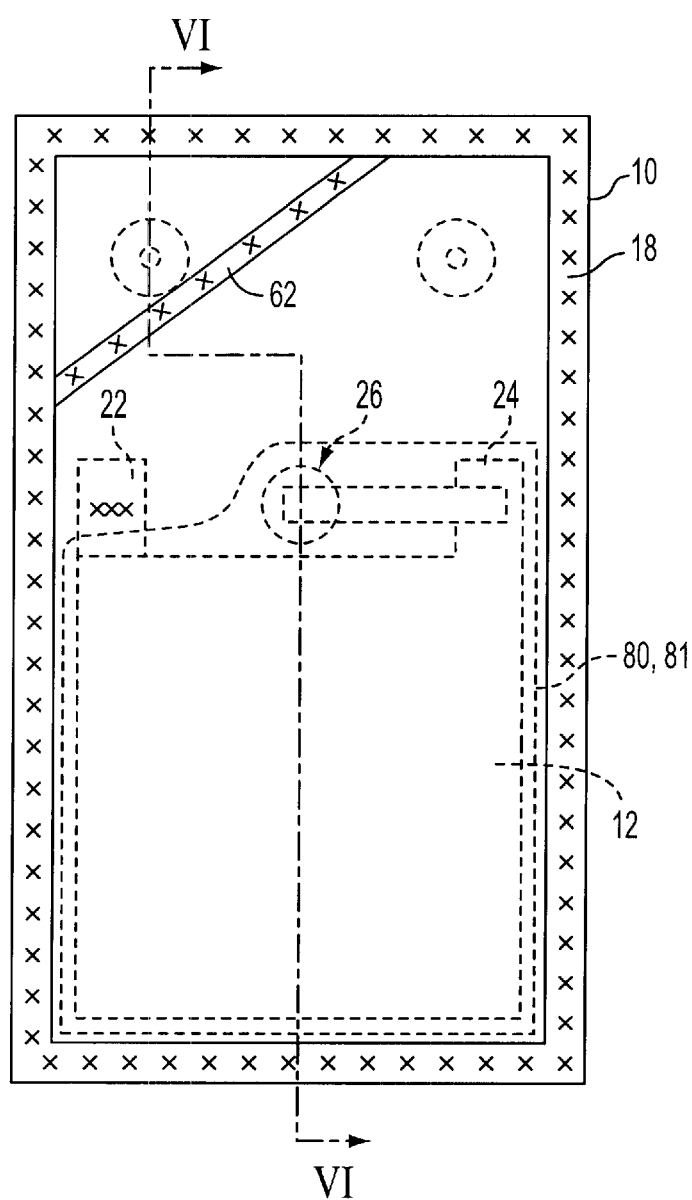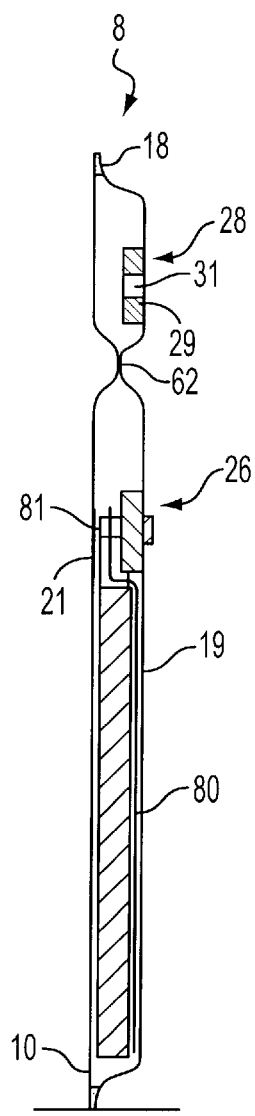
FIG. 5
FIG. 6

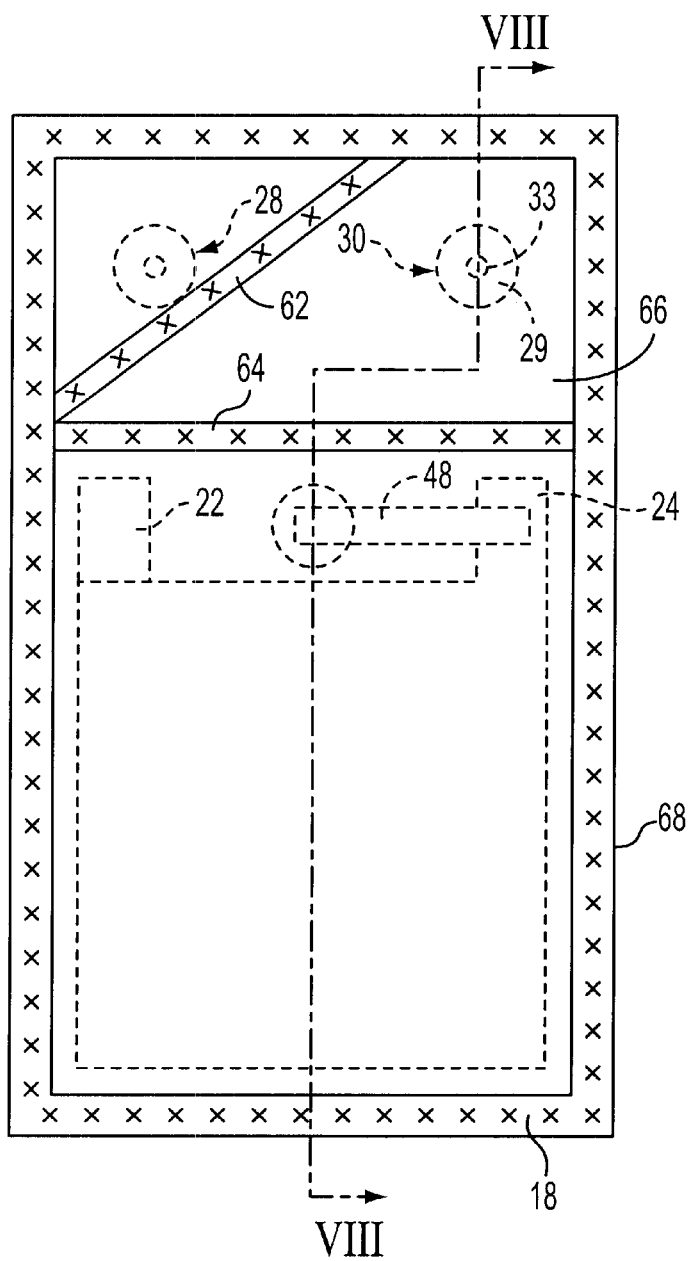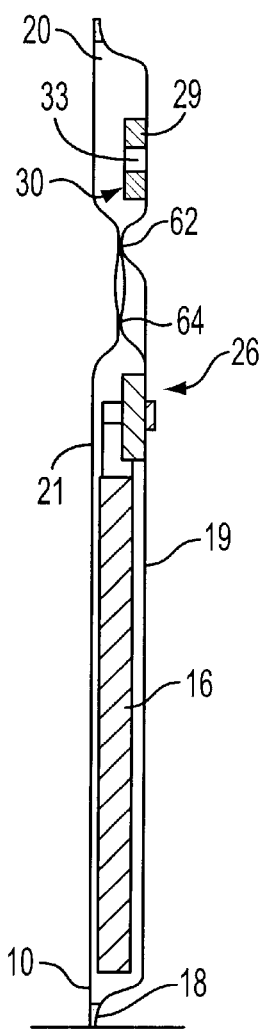
FIG. 7
FIG. 8

METHOD OF FABRICATING ELECTROCHEMICAL CELL

This is a divisional application of Ser. No. 09/468,352 filed Dec. 21, 1999 now U.S. Pat. No. 6,426,163; the entire disclosure of which is incorporated herein by reference.

BACKGROUND OF THE INVENTION

1. Field of the Invention

The present invention relates to an improved cell package which can be welded to hermetically seal the cell package after the cell stack and electrolyte have been placed in the package and a method of manufacturing the same.

2. Background

A important consideration in the manufacturing of electrochemical batteries is the manner in which the electrolyte is introduced into the cell stack. As discussed in a related patent application, one current technique includes the steps of pouring the electrolyte into the cell stack during the manufacturing of the cell stack in a machine, placing the electrolyte impregnated cell stack into the cell package, evacuating the cell package and heat sealing the package.

This technique has shortcomings. One potential concern is the loss of electrolyte during the step of pouring the electrolyte into the cell stack and the subsequent step of evacuating the package. The electrolyte is a relatively expensive component of the electrochemical cell. Thus, the loss of electrolyte increases the overall cost of manufacturing the cell.

A second potential concern is that the electrolyte that is suctioned from the cell stack during the evacuating step contaminates the inside of the package. Such contamination of the package may make it difficult to securely seal the package. As such, subsequent leakage of the electrolyte from the sealed package may result. A further concern is that the pouring step must be performed in a glove box environment (i.e., dry and inert atmosphere). Since this step is an intermediate step in the manufacturing of the cell stack, the machine which manufactures the cell stack must consequently have a glove box environment, thus driving up the cost of the machine. In addition, when the electrolyte is poured into the cell stack, the electrolyte contaminates the machine.

The current cell package is formed of a laminate of a polyester outer layer, an aluminum barrier layer and a polyethylene or polypropylene inner layer. The polyester layer provides strength, the aluminum layer prevents water from penetrating the cell package and the inner layer allows for the heat sealing of the cell package. Specifically, generally, the cell package includes two parts that are bonded together around their periphery by heat sealing the inner layers to each other. The problem with this laminate is that once contaminated with electrolyte, the inner layers may not form a secure heat seal. This makes degassing and resealing of the cell package a problem. Finally, when a polymer is used as an inner layer, the electrolyte may still be able to permeate through the polymer itself. This is especially true if the battery is exposed to elevated temperatures.

SUMMARY OF THE INVENTION

It is an object of the invention to provide a method of manufacturing an electrochemical cell which overcomes the above problems. In particular, an object of the invention is to provide a method of manufacturing a cell where the electrolyte is introduced into the cell stack with minimal or no loss of electrolyte. Another object of the invention is to provide a method in which the electrolyte filling step is performed after the cell stack is manufactured so that the cell stack manufacturing machine does not have to maintain a glove box environment and contamination of the machine is eliminated. Another object of the invention is to provide a packaging, which minimizes the possibility of electrolyte permeation through the seals.

These and other objects are achieved by a method of fabricating an electrochemical cell, comprising the steps of forming an electrode cell stack and a metallic cell package having a base portion and a lid portion which are welded to each other to define an enclosure, the cell package including a first section for receiving the cell stack and a second section having an inlet port which communicates with the first section; placing the cell stack into the enclosure in the first section; sealing the lid portion to the base portion around a periphery of the cell package to form a peripheral seam; applying a vacuum to the enclosure through the inlet port in the cell package; introducing an electrolyte into the enclosure via the inlet port; and welding the lid portion to the base portion to form a first weld seam located between the first and second sections to seal off the first section from the second section. The first weld seam extends from the peripheral seam on a first side of the cell package to the peripheral seam a second side of the cell package.

The method further includes the steps of partially charging the cell stack resulting in generation of gases inside the enclosure; puncturing the cell package to form an evacuation port located in a third section of the cell; applying a vacuum to the evacuation port of the cell stack to withdraw the gases; and sealing the lid portion to the base portion across a second weld seam located between the first section and the third section. According to one preferred aspect of the invention the second weld seam extends from the first side to a third side opposite the first side. After the second weld seam has been formed, the excess portions of the cell package, corresponding to the second and third sections, are removed from the first section which holds the cell stack.

The electrochemical cell according to a preferred embodiment of the invention comprises: a casing; and an electrode cell stack contained within the casing along with an electrolyte. The casing includes a base and a lid that are made of a metallic material such that they can be welded to each other along a seam weld to form an enclosure for receiving the cell stack. This is different from conventional cell packages where the parts are heat sealed to each other. The metallic material of the casing is, for example, aluminum, copper, nickel or stainless steel. The weld seam extends around a periphery of the cell package.

The cell stack includes first and second tabs of opposite polarity. The electrochemical cell further comprises a pass-through terminal secured to the casing and electrically connected to the second tab while the first tab is electrically connected to the casing. According to one aspect of the invention, the pass-through terminal comprises an eyelet having a first through-hole, an insulator located in the first through-hole of the eyelet and having a second through-hole; and a terminal post located in the second through-hole of the insulator so as to be insulated from the eyelet, wherein the eyelet is welded to the metallic material of the casing and the terminal post is electrically connected to the second tab of the cell stack. If the casing is made of copper, the eyelet is nickel plated iron, the insulator is glass and the terminal post is molybdenum. Also, the terminal post and the second tab have a positive polarity and the first terminal and the copper casing have a negative polarity.

On the other hand, when the casing is made of aluminum, the eyelet is aluminum, the insulator is ceramic and the terminal post is copper. In this case the terminal post and the second tab have a negative polarity and the first terminal and the aluminum casing have a positive polarity.

According to another aspect of the invention, when the casing is aluminum, the pass-through terminal comprises a copper rivet, at least one insulator circumscribing the rivet so as to insulate the rivet from the casing, and a nickel washer disposed on an outside of the casing and contacting the rivet with the insulator insulating the washer from the casing. In this case, the rivet and the second tab have a negative polarity and the first terminal and the aluminum casing have a positive polarity.

With the above electrochemical cell and related fabrication technique there is little or no electrolyte loss. In particular, since the electrolyte is injected into the electrode cell stack after the package has been sealed, substantially all of the electrolyte is suctioned into the electrode cell stack without any of the electrolyte escaping from the package. In addition, contamination of the cell manufacturing machine with electrolyte is minimized. Accordingly, all of the concerns discussed above with respect to the current technique are overcome.

Further, since the casing is made of a metallic material such as copper or aluminum, the package can be sealed by welding, instead of by heating. It has been discovered that electrolyte contamination does not interfere with a welded seal. The welding process can be, but is not limited to, ultrasonic welding.

BRIEF DESCRIPTION OF THE DRAWINGS

The above and other objects, features and advantages of the present invention will be better understood from the following specification when read in conjunction with the accompanying drawings in which:

FIG. 5 is a plan view showing the cell package after the electrolyte has been introduced into the cell package;

FIG. 6 is a sectional view taken along lines 6—6 of FIG. 5;

FIG. 7 is a plan view of the cell package after the degassing step;

FIG. 8 is a sectional view taken along line 8—8 of FIG. 7;

DETAILED DESCRIPTION OF THE INVENTION

Figure 1:
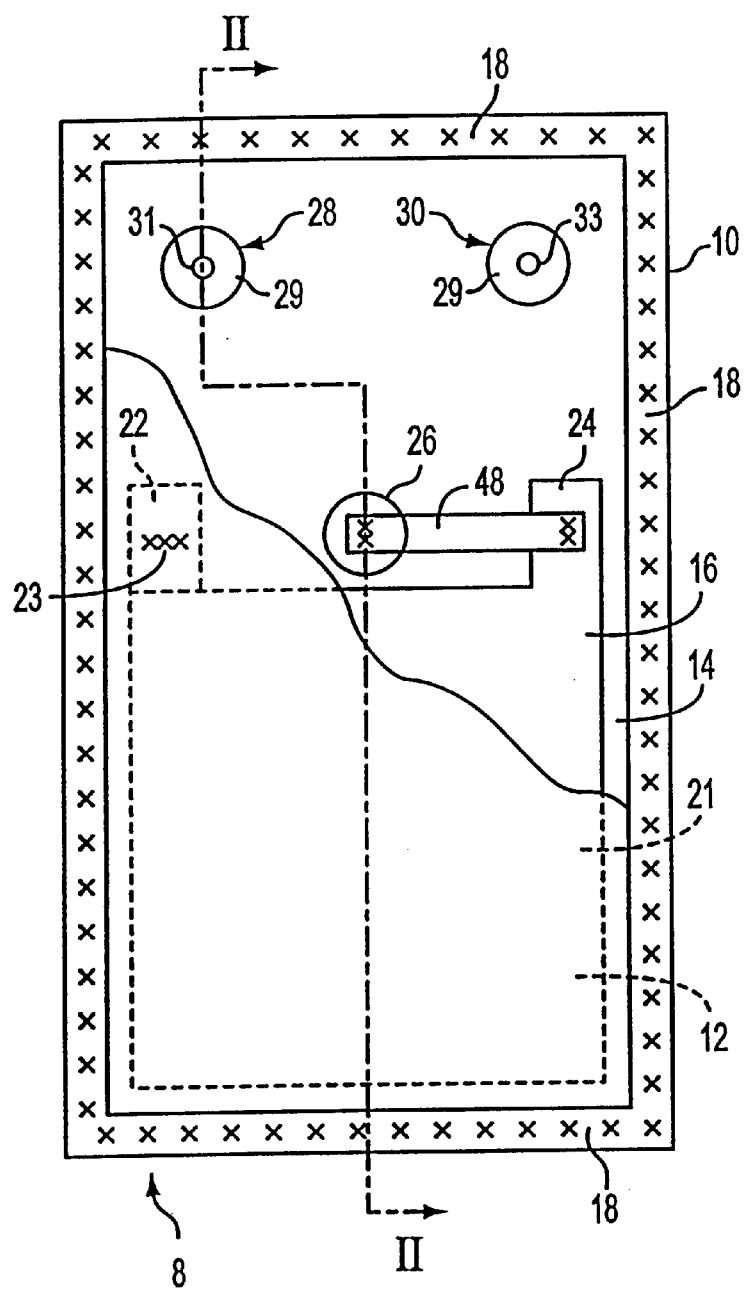
FIG. 1 is a plan view showing the cell package with the cell stack located therein.
Figure 2:
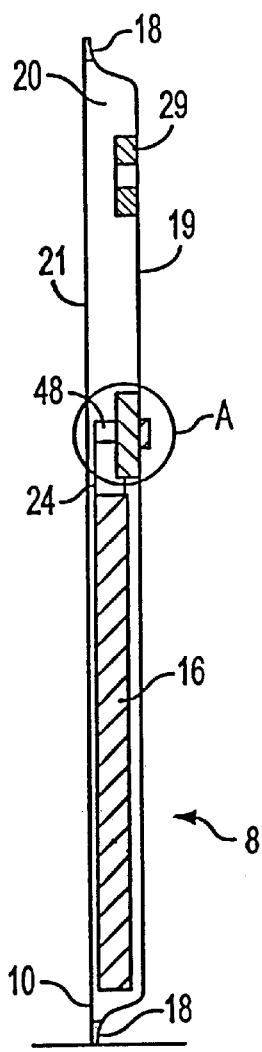
FIG. 2 is a sectional view taken along line 2—2 of FIG. 1 showing the cell package.

Referring to FIGS. 1 and 2, the electrochemical cell 8 includes a cell package 10 having the shape of an envelope which is formed of a metallic sheet or sheets 12 so as to define an opening 14 therein for receiving a cell stack 16. The package is preferably formed of two metallic sheets 12 that are welded along the edge to form weld seam 18. The welding process can be, but is not limited to, ultrasonic welding.

One of the two sheets is a base 19 that has a cell stack cup 20 in which the cell stack 16 is placed. The other sheet is a lid 21. Alternatively, the package 10 can be formed from a single metallic sheet that is folded in half leaving only three edges to be welded. According to the preferred embodiment, the metal sheet is made from aluminum or copper, although the invention is not to be limited to these materials. For example, other suitable materials include stainless steel and nickel.

As is conventional, the cell stack 16 includes a first tab 22 (of a first polarity) and a second tab 24 (of a second polarity). Since the cell package 10 is made of a metallic material which is conductive, according to the invention, the first tab 22 of the cell stack 16 is electrically connected directly to the cell package at weld 23. On the other hand, the second tab 24 is connected to a pass-through terminal assembly 26 (shown schematically in FIGS. 1 and 2) which is provided in one of the sheets of the cell package to allow external connection to the second tab 24 of the cell stack. As discussed below, the polarity of the first and second tabs is dependent on the material of the cell package.

Referring to FIG. 1, the cell package also includes an electrolyte introducing portion 28 and degassing portion 30 which communicate with the inside of the package. Each of these portions includes a washer 29 which is welded to the inside surface of the cell package material, as shown in FIGS. 2 and 8. As discussed in greater detail below, the electrolyte introducing portion 28 has an electrolyte port 31 therein. The port 31 can be formed before or after the cell package is formed. On the other hand, as discussed below, the degassing portion 30 is punctured after the cell stack formation process to form degassing port 33 therein. The electrolyte port 31 is used to introduce the electrolyte into the cell package 10 to activate the cell stack 16 and the degassing port 33 is used to degas the cell package 10 after formation. The material of the washer 29 must be compatible with that of the cell package. If the cell package 10 is made of copper, it is preferable that the washer 29 be nickel plated iron; if the cell package 10 is made of aluminum, it is preferable that the washer be aluminum.

Figure 3:
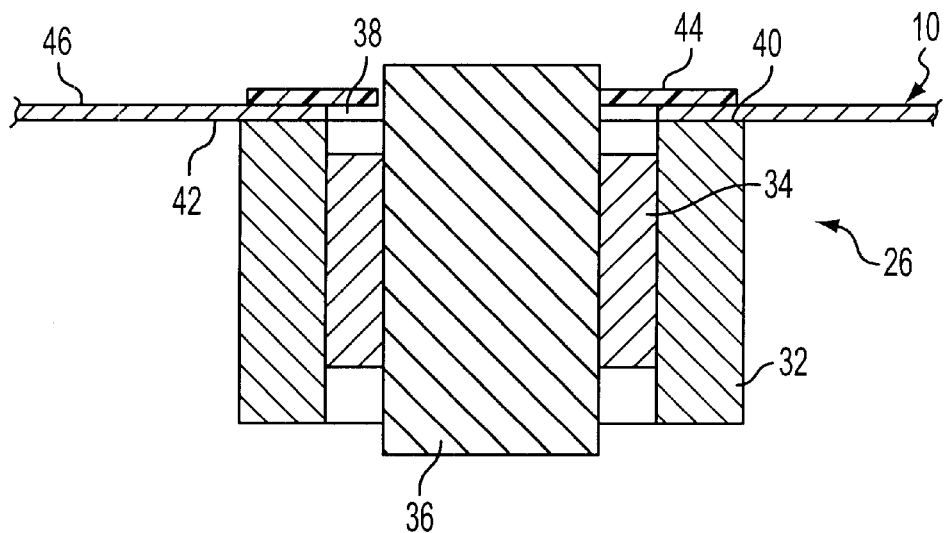
FIG. 3 is a sectional view showing the pass-through terminal of the present invention for interconnecting one of the tabs of the cell stack to an external equipment, according to one aspect of the invention.

The following is a description of the design of the pass through terminal assembly 26. There are two alternative designs respectively illustrated in detail in FIGS. 3 and 4. With reference to FIG. 3, according to a first of these designs, the pass-through terminal assembly 26 includes an eyelet 32, an insulator 34 and a terminal post 36. The eyelet 32 and insulator 34 are tubular members. The insulator 34 is located inside the eyelet 32 and the terminal post 36 is located inside the insulator 34. The cell package 10 has a hole 38 therein through which the terminal post 36 protrudes. The eyelet 32 is located on the inside of the cell package 10 with the back surface 40 of the eyelet welded to the inside surface 42 of the cell package. A plastic washer 44 is adhered to the outside surface 46 of the cell package.

Referring also to FIG. 1, the second tab 24 is electrically connected to the terminal post 36 of the terminal assembly 26 via a lead 48 which is welded at one end to the second tab 24 and at the other end to the terminal post 36. Thus, with this arrangement, the second tab 24 is electrically connected to the terminal post 36, which protrudes to the exterior of the cell package 10, while being insulated from the metallic cell package by the insulator 34. Hence, when connecting the cell to the external equipment, one terminal (not shown) of the equipment is simply placed in contact with the metallic cell package 10 to which the first tab 22 of the cell stack is connected, and the other terminal (not shown) of the external equipment is electrically connected to the terminal post 36, to which the second tab 24 of the cell stack is electrically connected via lead 48.

The lead 48 and the accessible parts of the stack 16, with the opposite polarity of the metallic packaging 10, should be insulated using internal insulators 80 and 81, as shown in FIGS. 5 and 6.

As noted above, according to the preferred embodiment of the invention, the cell package can be made of either aluminum or copper. While nickel is also an option, it is relatively expensive and, hence, not preferred. When the cell package is made of copper, the first tab 22 of the cell stack 16 has a negative polarity and the second tab 24 of the cell stack 16 has a positive polarity. Therefore, in this case the cell package 10, to which the first tab 22 is directly connected, has a negative polarity and the terminal post 36 of the terminal assembly 26 has a positive polarity. Also, it has been discovered that for best results, for a cell package made of a copper material, the eyelet 32 should be made of nickel plated iron, the insulator 34 should be made of a glass (e.g., Sandia TR 23™) and the terminal post should be made of molybdenum.

On the other hand, when the cell package 10 is made of aluminum, the first tab 22 of the cell stack 16 has a positive polarity and the second tab 24 of the cell stack 16 has a negative polarity. Therefore, in this case the cell package 10, to which the first tab 22 is directly connected, has a positive polarity and the terminal post 36 of the terminal assembly 26 has a negative polarity. It is preferable that the eyelet 32 be made of aluminum, the insulator 34 be made of a ceramic (e.g., $Al_2O_3$) and the terminal post be made of copper.

Figure 4:
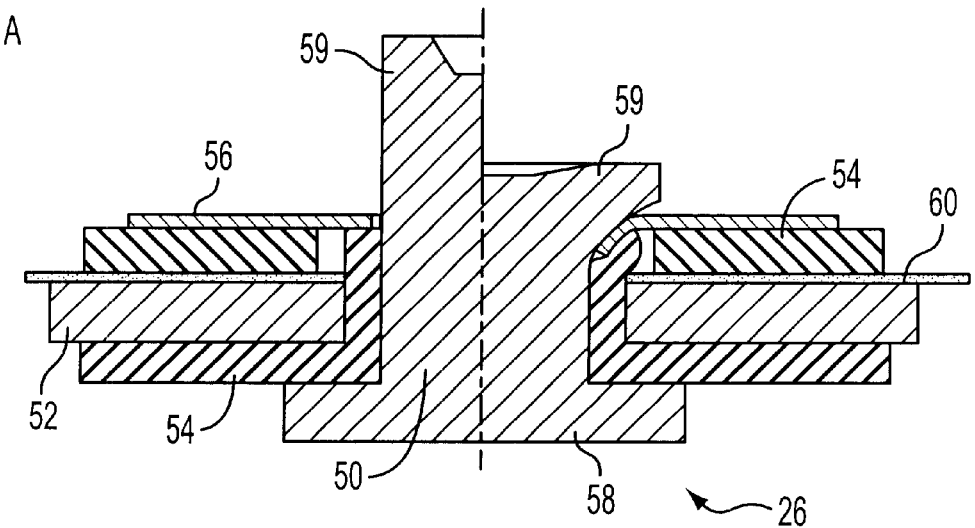
FIG. 4 is a sectional view showing the pass-through terminal of the present invention for interconnecting one of the tabs of the cell stack to an external equipment, according to another aspect of the invention.

An alternative design of the pass-through terminal assembly 26 is illustrated in FIG. 4. This design is preferred when using a cell package made of aluminum. According to this embodiment, the terminal assembly 26 includes a rivet 50, an internal washer 52, insulators 54 and an external washer 56. According to a preferred embodiment, the rivet 50 is made of copper, the internal washer 52 is made of aluminum, the insulators 54 are made of polyethermide (e.g., Ultem™ made by General Electric) and the external washer 56 is made of nickel.

As shown in FIG. 4, the rivet 50 extends through the holes provided in the cell package 10, the insulators 54, and the internal and external washers 52 and 56 so that it protrudes from the cell package. With the head 58 of the rivet located on the inside of the cell package 10, the opposite end 59 of the rivet 50 is flared outwardly until it contacts the nickel washer 56. The insulators 54 prevent the rivet 50 and the external nickel washer 56 from contacting the aluminum cell package 10 to prevent shorting of the cell stack 16. The outside face 60 of the internal washer 52 is welded to the inside surface 42 of the aluminum cell package such that the terminal assembly 26 is securely retained to the cell package. The purpose of the external nickel washer 56 is to make electrical contact with the negative terminal of the external equipment. As with the embodiment of FIG. 2, the second tab 24 of the cell stack 16 is electrically connected to the rivet via the lead 48. Since the cell package in this embodiment is aluminum, the polarity of the second tab 44 is negative so that the polarity of the rivet 50 is likewise negative. Naturally, the lead 40 must be insulated to some degree so that it will not contact the cell package which has the opposite polarity.

Figure 9:
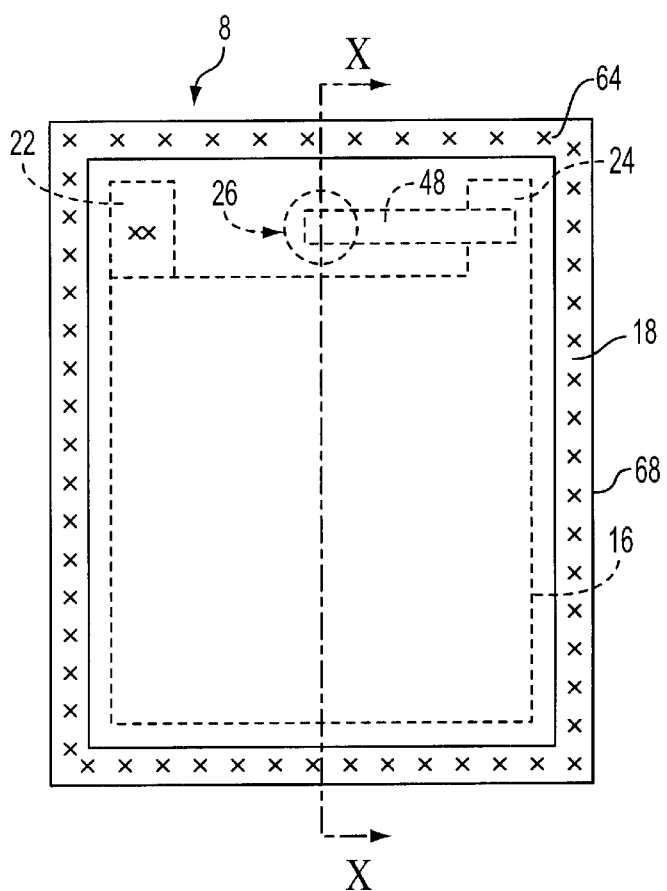
FIG. 9 is a plan view of the cell package after the removal of the excess material of the cell package.
Figure 10:
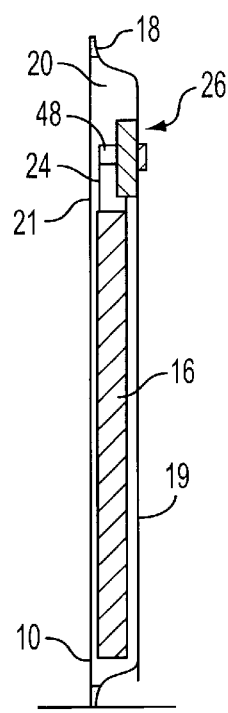
FIG. 10 is a sectional view taken along line 10—10 of FIG. 9.

A description of the method of activating the cell stack will now be provided with reference to the figures. As noted above, FIGS. 1 and 2 show the cell stack 16 located inside the cup 20 of the cell package 10. After the cell stack has been placed in the cup 20, the lid 21 is welded to the base 19 around the periphery of the cell package 10 as indicated by the weld seam 18. After the cell package has been welded, a vacuum is applied to the electrolyte port 31 after which electrolyte is introduced through the electrolyte port into the cell package 10. After the filling of the electrolyte, the cell package is welded along weld seam 62, as shown in FIGS. 5 and 6. The electrochemical cell is then partially charged (i.e., formation) generating gases inside the cell package 10. As shown in FIGS. 7 and 8, after formation, the degassing portion 30 is then punctured to form the degassing port 33 in the cell packaging material and a vacuum is then applied to withdraw the formation gases from the inside of the cell package 10. The cell package is then welded along weld seam 64 shown in FIG. 7. Referring also to FIGS. 9 and 10, the excess material 66 of the cell package is then trimmed leaving only the lower portion 68 where the cell stack 16 is located resulting in the electrochemical cell 8.

Having described the invention with particular reference to the preferred embodiments, it will be obvious to those skilled in the art to which the invention pertains after understanding the invention, that various modifications and changes may be made therein without departing from the spirit and scope of the invention as defined by the claims appended hereto.

What is claimed is:

1. A method of fabricating an electrochemical cell, comprising the following steps:
    forming an electrode cell stack and a metallic cell package having a base portion and a lid portion defining an enclosure, said cell package including a first section for receiving said cell stack and a second section having an inlet port which communicates with said first section;
    placing said cell stack into said enclosure in said first section;
    sealing said lid portion to said base portion around a periphery of said cell package to form a peripheral seam;
    introducing an electrolyte into said enclosure via said inlet port; and
    welding said lid portion to said base portion to form a first weld seam located between said first and second sections to seal off said first section from said second section.

2. The method of fabricating an electrochemical cell according to claim 1, wherein said sealing step includes the step of welding said lid portion to said base portion.

3. The method of fabricating an electrochemical cell according to claim 2, wherein said first weld seam extends from said peripheral seam on a first side of said cell package to said peripheral seam on a second side of said cell package.

4. The method of fabricating an electrochemical cell according to claim 3, wherein said first and second sides are contiguous with each other.

5. The method of fabricating an electrochemical cell according to claim 3, further comprising the following steps:
    at least partially charging said cell stack resulting in generation of gases inside said enclosure;
    puncturing said cell package to form an evacuation port located in a third section of said cell;

applying a vacuum to said evacuation port of said cell stack to withdraw said gases; and welding said lid portion to said base portion across a second weld seam located between said first section and said third section.

6. The method of fabricating an electrochemical cell according to claim 5, wherein said second weld seam extends from said first side to a third side opposite said first side.

7. The method of fabricating an electrochemical cell according to claim 6, further comprising the step of cutting said cell package to remove said second and third sections from said first section.

8. The method of fabricating an electrochemical cell according to claim 1, further comprising the step of applying a vacuum to said enclosure through said inlet port in said cell package prior to said introducing step.

* * * * *